A. LANCASTER.
NUT TIGHTENING DEVICE.
APPLICATION FILED AUG. 12, 1920.

1,363,183.  Patented Dec. 21, 1920.

INVENTOR,
Acy Lancaster,
BY J. A. Bishop
ATTORNEY.

UNITED STATES PATENT OFFICE.

ACY LANCASTER, OF MALVERN, OHIO.

NUT-TIGHTENING DEVICE.

1,363,183.  Specification of Letters Patent.  Patented Dec. 21, 1920.

Application filed August 12, 1920. Serial No. 403,124.

*To all whom it may concern:*

Be it known that I, ACY LANCASTER, a citizen of the United States, residing at Malvern, in the county of Carroll and State of Ohio, have invented a new and useful Nut-Tightening Device, of which the following is a specification.

This invention relates to nut tightening devices, and more especially to a device of this character designed for use on nuts securing the bolts through the rail web and fish plates of railroad joints.

The object of the invention is to provide a device of this character which will automatically tighten the nut on the bolt, when the same becomes loosened.

Another object is the provision of means for preventing the said device from being actuated when the nut to which it is applied needs no tightening.

With these and other objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

Figure 1:
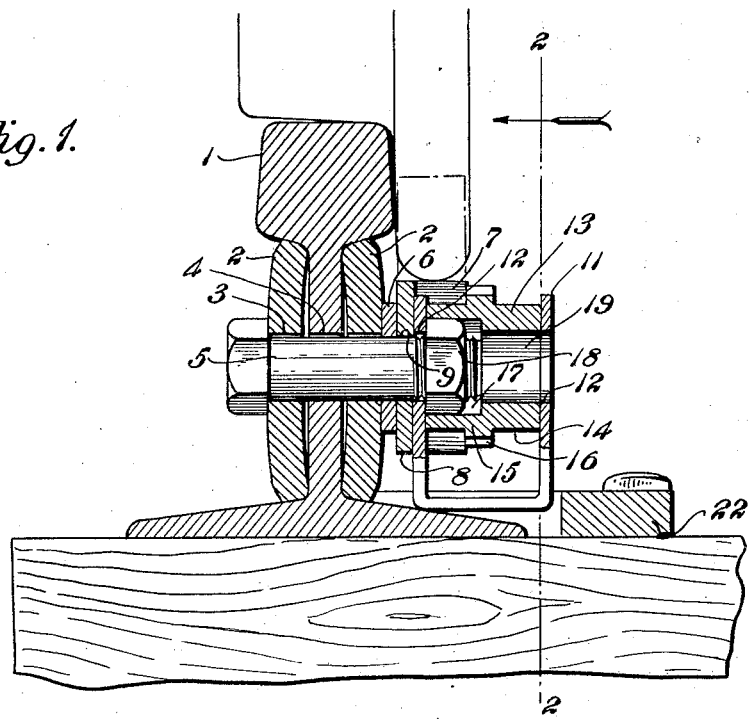

In the drawings, Figure 1, is a cross sectional view through a rail at a point adjacent to the joint thereof with the next rail, showing the fish plates in position and my device applied to the nut securing one of the bolts through the said rail and fish plates.

Figure 2:
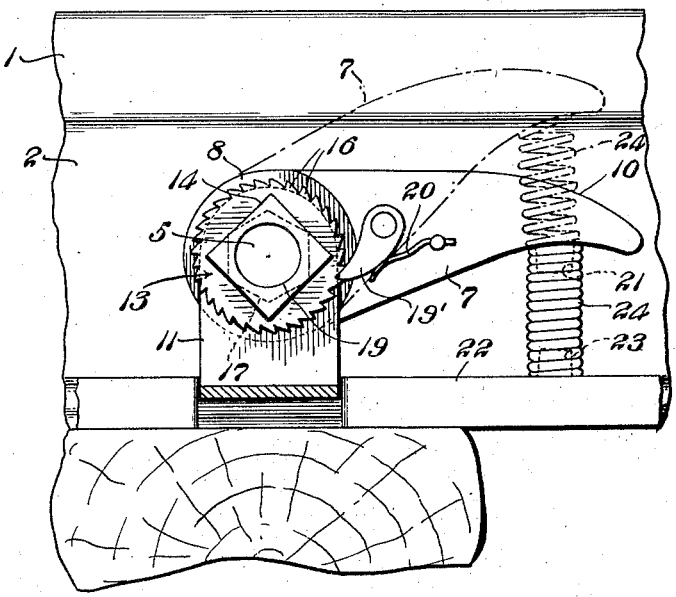

Fig. 2 is a sectional view taken on the line 2—2 of Fig. 1, looking in the direction indicated by the arrow.

In securing the adjoining ends of railroad rail sections, together, the abutting ends of the rails are positioned upon the ties and metal plates, commonly known as fish plates are then placed longitudinally of the web of the rails, on either side of the said web, at the said rail joint. A series of bolt holes are formed in these fish plates, which bolt holes are designed to register with similar bolt holes in the rails, and a bolt is then inserted through each of the said bolt holes and a nut placed on the free end thereof. Due to the constant passing of trains over the rail joints, the bolts securing the said joints, as above described, will stretch in length. A great number of nut locking devices have been devised, and are now in use to prevent a nut placed upon a bolt and tightened thereon from unscrewing and loosening, but none of these nut locking devices are designed to do more than prevent the nut from unscrewing. When the bolt securing a rail joint has stretched as just described, the nut lock therefore is not capable of tightening the said nut to offset the stretch in the bolt. As is well known, all railroads employ large forces of men known as track walkers, one of whose main duties is to constantly inspect the railroad track in search of loosened nuts on rail joints, and to tighten the said nuts when found. It is obvious that this entails an enormous expenditure on the part of the railroads, and also that in spite of great diligence on the part of the said track walkers, loosened nuts are very frequently overlooked, and loose rail ends and wrecks of passing trains often follow as a result.

My invention is designed to positively keep the nut securing a bolt through a rail joint tightened at all times, regardless of the amount of stretch which may take place in the said bolt. At 1, I have shown a rail such as is in common use on railroads, with the usual fish plates 2 used in connecting the rail joints. The usual bolt holes 3 are formed in the fish plates and placed to register with the bolt hole 4 in the rail web, and through the said bolt holes is then inserted the usual bolt 5. The bolt 5 will be inserted from the outside of the rail so that its threaded end, extending through the other side of the rail, will be between the rails of the track, and upon this threaded end of the bolt and adjacent the inner fish plate, I then place an ordinary washer 6. The actuating arm 7 having a reduced portion 8 provided with a bolt aperture 9, is now placed upon the free end of the bolt 5 with the said bolt 5 projecting through the aperture 9. One side of the reduced portion 8 of the arm 7 is placed in contact with the washer 6. The end of arm 7 opposite the reduced portion 8 is rounded upon its upper face as indicated at 10 for a purpose to be hereinafter more fully set out.

At 11 I have shown a U-shaped member which I will preferably form of heavy gage sheet iron, or similar material, the upright portions of said U-shaped member being sufficiently rigid to prevent their being bent. Bolt holes 12 are formed in the upright portions of the U-shaped member, in alinement with each other, and between the said upright portions of the U-shaped member and designed to exactly fit the space therebetween, I place a nut housing 13. This nut housing is formed with a squared portion 14 at its outer end, and with an enlarged cylindrical portion 15 intermediate its ends. Upon the enlarged cylindrical portion 15 are formed ratchet teeth 16. A chamber 17 designed to fit the usual nut 18, to be threaded on the bolt 5, is formed within the said nut housing. A cylindrical chamber 19 of slightly greater diameter than the bolt 5, extends from the chamber 17 through the squared portion 14 of the nut housing and registers with the aperture 12 in the outer upright portion of the U-shaped member 11. Pivotally mounted upon the side of the arm 7 is a pawl 19', which pawl is held in contact with the ratchet teeth 16 by the tension of a leaf spring 20.

Upon the under side of the arm 7 adjacent its free end is formed a downwardly projecting stud 21, and secured in any suitable manner to the ties supporting the rail, is a plate 22, upon which plate, in direct alinement beneath the stud 21, is formed an upwardly projecting stud 23. A coil spring 24 is secured in position between the plate 22 and the arm 7 by means of said studs 21 and 23 and is designed to constantly exert an upward pressure against the arm 7 to raise the said arm.

In assembling my device, the bolt 5 will be inserted through the fish plates and rail web as above described and the washer 6 placed adjacent to inner fish plate. The aperture 9 in the arm 7, will then be passed over the threaded end of the bolt 5 and the said arm positioned in contact with the washer 6. The nut 18 will next be placed within the chamber 17 of the nut housing 13 and the said nut housing positioned between the upright portions of the U-shaped member 11 with the aperture 12, in one side of the U-shaped member registering with the chamber 19 and the aperture 12 in the opposite side of the U-shaped member, registering with the bolt aperture in the nut 18. The nut housing with the nut therein and the U-shaped member thus assembled, are now positioned so that the threaded end of the bolt 5, will project through the aperture 12 in the U-shaped member adjacent the nut 18. A wrench is then applied to the squared portion 14 of the nut housing and the nut housing rotated in the direction to start the threads within the nut 18 feeding down the threads on the bolt 5. The spring 24 is now placed in the position shown in Fig. 2, and the arm 7 is depressed against the tension of the said spring 24 until the nut 18 has been tightened as far as it will go on the bolt 5. It will now be seen that the reduced portion 8 of the arm 7 will be securely held between the washer 6 on the one side and the arm of the U-shaped member 11 on the other, and the spring 24 will thus be unable to raise the free end of the said arm 7. Should the bolt 5 now become stretched through use, or should the nut 18 loosen upon the said bolt, the pressure against the opposite sides of the reduced portion 8 of the arm 7, will be removed and the spring 24 will be permitted to lift the free end of the arm 7 upwardly into the position shown by the dotted lines in Figs. 1 and 2. It will thus be seen that the arm 7 will lie directly in the path of the flange of a car wheel passing along the track, and as the flange rides over the upstanding end of the arm 7, the said arm will again be depressed, and since the pawl 19' is at all times in contact with the ratchet teeth 16 upon the nut housing, the said nut housing will be rotated as the arm 7 is pressed downwardly by the said car wheel flange, thus tightening the nut 18 once more upon the bolt 5, and recreating the pressure upon the opposite sides of the reduced portion 8 of the said arm 7. It will now be seen that when the train has passed the nut has been securely tightened once more upon the bolt and the arm 7 depressed out of the path of the next car wheel, thus there is no danger of the device operating unless the nut 18 is actually loose upon the bolt, and breaking of the device or stripping of the threads is eliminated.

As above described, the free end of the arm 7 is rounded as shown at 10 so that when the said arm is in elevated position, the flange of a car wheel passing in either direction over the track will ride easily over the arm 7 and depress it.

It will be seen that when the device has been assembled as above described, the U-shaped member 11 by its contact with the outer face of the squared portion 14, will prevent the nut housing from being removed. While I have shown my device as applied to a hexagonal nut, it is obvious that by changing the shape of the chamber 17, in the nut housing, it can be made to be applied to any shape of nut.

When my device has been secured in place and the nut tightened, it will be impossible for any person not equipped with the special tools necessary to loosen the said nut, and the device is therefore safe against the tampering of trespassers.

Having now described my invention what I claim as new and desire to cover by Letters Patent is:—

1. In a device of the character described, a nut housing and a pivoted arm coöperating with said nut housing to tighten the nut within said housing upon its bolt.

2. A nut tightening device comprising a nut housing designed to receive a nut threaded on a bolt, and a pivotally mounted arm for rotating the said nut housing to tighten the nut on the bolt.

3. A nut tightening device comprising a nut housing, a chamber within said nut housing designed to receive and fit upon a nut threaded on a bolt, a pivotally mounted arm for rotating said nut housing to tighten the nut on the bolt threads.

4. A nut tightening device comprising a nut housing, a chamber within said nut housing designed to receive and fit upon a nut threaded upon a bolt, ratchet teeth formed on said nut housing and means coöperating with said ratchet teeth to rotate said nut housing and nut therein in the direction to tighten the nut upon the bolt threads.

5. A nut tightening device comprising a nut housing, ratchet teeth formed upon said nut housing, an actuating arm, means carried by said actuating arm and in engagement with said ratchet teeth to rotate said nut housing when said arm is actuated.

6. A nut tightening device comprising a nut housing, ratchet teeth formed upon said nut housing, a pivotally mounted arm, a pawl carried by said arm and held in engagement with said ratchet teeth, said pivotally mounted arm being designed to swing upon its pivot and rotate said nut housing by the engagement of said pawl and ratchet teeth.

7. A nut tightening device comprising a nut housing, an interior chamber within said nut housing designed to receive and fit a nut, ratchet teeth formed upon said nut housing, a pivotally mounted arm and a pawl carried by said arm and in engagement with said ratchet teeth, a spring mounted to move the said pivotally mounted arm and pawl carried thereby in one direction and in the path of a moving object, said pivotally mounted arm when so moved, being designed to be engaged by said moving object and to be moved in the opposite direction against the tension of said spring, the said pawl engaging the said ratchet teeth being arranged to rotate the said nut housing when the said arm is moved in the said opposite direction.

8. A nut tightening device comprising a nut housing designed to be positioned and to fit upon a nut threaded upon a bolt in a railroad rail joint, ratchet teeth formed upon said nut housing, an arm pivotally mounted upon the bolt in the rail joint, a pawl carried by said pivotally mounted arm and in engagement with said ratchet teeth, a spring positioned to raise the free end of said pivotally mounted arm when the nut upon the bolt is loosened, the said pivotally mounted arm being designed to be engaged by the flange on a wheel traveling upon the rail, and to be depressed thereby, the said arm when so depressed causing the pawl carried thereby to rotate the nut housing in the direction to tighten the nut upon the bolt.

In testimony that I claim the above, I have hereunto subscribed my name.

ACY LANCASTER.